United States Patent
Prüssmeier et al.

(10) Patent No.: US 10,469,285 B2
(45) Date of Patent: Nov. 5, 2019

(54) BUS SYSTEM COMPRISING A FEED MODULE AND A LOAD MODULE

(71) Applicant: BECKHOFF AUTOMATION GMBH, Verl (DE)

(72) Inventors: Uwe Prüssmeier, Lemgo (DE); Thomas Rettig, Rheda-Wiedenbrück (DE); Christopher Pohl, Verl (DE); Johannes Künne, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 202 days.

(21) Appl. No.: 15/784,000

(22) Filed: Oct. 13, 2017

(65) Prior Publication Data
US 2018/0041359 A1 Feb. 8, 2018

Related U.S. Application Data

(63) Continuation of application No. PCT/EP2016/058091, filed on Apr. 13, 2016.

(30) Foreign Application Priority Data

Apr. 14, 2015 (DE) .......... 10 2015 105 702

(51) Int. Cl.
*H04L 12/10* (2006.01)
*H04L 12/40* (2006.01)

(52) U.S. Cl.
CPC ........ *H04L 12/40045* (2013.01); *H04L 12/10* (2013.01); *H04L 2012/4026* (2013.01)

(58) Field of Classification Search
CPC .................. H04L 12/40045; H04L 12/40
See application file for complete search history.

(56) References Cited

U.S. PATENT DOCUMENTS

| 6,218,930 | B1 | 4/2001 | Katzenberg et al. |
| 8,132,035 | B2 | 3/2012 | Juillerat et al. |
| 9,768,978 | B2* | 9/2017 | Coenen ................. H02J 7/0014 |

(Continued)

FOREIGN PATENT DOCUMENTS

| DE | 102010049835 A1 | 5/2012 |
| DE | 102011087828 A1 | 6/2013 |
| WO | 2016166143 A1 | 10/2016 |

*Primary Examiner* — Hai L Nguyen
(74) *Attorney, Agent, or Firm* — Dorsey & Whitney LLP

(57) ABSTRACT

A bus system comprises a data line having a first channel with a first pair of wires and a second channel with a second pair of wires. The first channel connects a physical feed module interface to a physical consumer module interface and a first DC voltage source to a first consumer module DC voltage consumer, to transmit a first differential data signal between the feed module interface and the consumer module interface and a first direct current from the first DC voltage source to the first consumer module DC voltage consumer. The second channel connects the feed module interface to the consumer module interface and a second DC voltage source to a second consumer module DC voltage consumer, to transmit a second differential data signal between the feed module interface and the consumer module interface and a second direct current from the second DC voltage source to the second consumer module DC voltage consumer.

18 Claims, 2 Drawing Sheets

(56) References Cited

U.S. PATENT DOCUMENTS

| | | |
|---|---|---|
| 9,780,974 B2 * | 10/2017 | Gardner .............. H04L 25/0274 |
| 10,211,994 B2 * | 2/2019 | Lin ......................... H04L 12/10 |
| 2010/0078992 A1 | 4/2010 | Landry et al. |
| 2010/0277293 A1 | 11/2010 | Yu et al. |

* cited by examiner

BUS SYSTEM COMPRISING A FEED MODULE AND A LOAD MODULE

CROSS-REFERENCE TO RELATED APPLICATION

This application is a continuation of International Patent Application PCT/EP2016/058091, filed Apr. 13, 2016, entitled BUS SYSTEM COMPRISING A FEED MODULE AND A LOAD MODULE, which claims priority to German Patent Application DE 10 2015 105 702.6, filed Apr. 14, 2015, entitled BUSSYSTEM MIT EINEM EINSPEISEMODUL UND EINEM VERBRAUCHERMODUL, each of which is incorporated by reference herein, in the entirety and for all purposes.

FIELD

The present invention relates to a method for operating a network.

The invention relates to a bus system for use in industrial automation, comprising a feed module and at least one consumer module, which feed module and consumer module are connected via a data line and a direct current supply. The invention further relates to a feed module and to a consumer module for a bus system of this kind.

BACKGROUND

Modern concepts in industrial automation, that is to say the control and monitoring of technical processes with the aid of software, are based on the idea of a central controller with a distributed sensor/actuator level. In this case, the subscribers communicate with one another and with superordinate systems via industrial data networks, also referred to as automation networks below.

Ethernet is the most widespread communication standard in local area networks and is stipulated primarily by the IEEE standard 802.3. Ethernet is based on a LAN structure in which a plurality of control nodes, for example computers or machines, are connected to one another in a wired manner, wherein the Ethernet protocol encapsulates the data to be transmitted in data packets, also referred to as a message below, with a predetermined format. In this case, it is possible to use different Ethernet variants which differ in terms of the transmission rate, the types of cable used and the line coding.

Communication between the subscribers generally takes place via a data line having four wires in industrially used Ethernet networks, wherein the four wires are often in the form of two twisted pairs of wires. Twisting the pairs of wires reduces crosstalk. The two wires in a pair of wires are always used together, wherein a differential data signal is transmitted via one pair of wires in each case. Sometimes, all four wires are also twisted together, which has the advantage of a higher degree of flexibility of the line.

An often compulsory requirement imposed on automation networks is that the outputs of a machine, the actuators, can be moved to a safe state at any time without losing the possibility of monitoring the machine. The sensors and the controller in the automation network must therefore be able to be operated independently of the actuators. For this reason, the energy supply for the actuators is generally separate from the energy supply for the sensors and the controller in order to disconnect the actuator supply independently of the sensor and controller supply.

The energy supply lines required in the automation network are generally laid independently of the data line, which makes it necessary to have at least two dedicated cabling systems with the corresponding contact technology. However, in industrial automation, it is desirable to always achieve cabling which is as cost-effective and simple as possible in the automation network. This is important, in particular, when good shielding, a high protection class or a high temperature resistance is required for the cabling on account of environmental requirements. The cabling is therefore often responsible for a relevant high proportion of the system costs.

One approach to saving costs in respect of cabling is to combine the power supply and the data transmission in one cabling system. With the aid of the so-called "Power over Ethernet" standard, an individual voltage can therefore be concomitantly transmitted in addition to the two differential data signals on the two twisted pairs of wires using a four-wire standard Ethernet data line. A specially adapted Ethernet transformer is used for this purpose in the PoE standard, which transformer applies the two potentials required for the voltage to each pair of wires via a center tap. However, since two separate energy supplies are often required in industrial automation, one for the actuators and the other for the sensors and the controller, an additional cabling system for a second energy supply is also required in a PoE system having a four-wire data line.

SUMMARY

Embodiments of the invention provide an improved bus system, in particular for use in industrial automation, an improved feed module and an improved consumer module for a bus system.

According to one embodiment a bus system comprises a feed module which is connected to a first DC voltage source and to a second DC voltage source and has a physical interface, a first transformer, a second transformer, a first inductive assembly, a second inductive assembly, a first capacitive assembly and a second capacitive assembly, a consumer module which has a first DC voltage consumer, a second DC voltage consumer, a physical interface, a first transformer, a second transformer, a first inductive assembly, a second inductive assembly, a first capacitive assembly and a second capacitive assembly. The bus system further comprises a data line which has a first channel with a first pair of wires and a second channel with a second pair of wires. The first channel of the data line connects the physical feed module interface to the physical consumer module interface via the first feed module transformer, the first capacitive feed module assembly, the first capacitive consumer module assembly and the first consumer module transformer, and connects the first DC voltage source to the first consumer module DC voltage consumer via the first inductive feed module assembly and the first inductive consumer module assembly, in order to transmit a first differential data signal between the physical feed module interface and the physical consumer module interface and to transmit a first direct current from the first DC voltage source to the first consumer module DC voltage consumer. The second channel of the data line connects the physical feed module interface to the physical consumer module interface via the second feed module transformer, the second capacitive feed module assembly, the second capacitive consumer module assembly and the second consumer module transformer, and connects the second DC voltage source to the second consumer module DC voltage consumer via the second inductive feed module assembly and the second inductive consumer module assembly, in order to transmit a second differential data signal between the physical feed module interface and the physical consumer module interface and to transmit a second direct current from the second DC voltage source to the second consumer module DC voltage consumer.

According to a further embodiment a feed module for a bus system which has a first DC voltage source and a second DC voltage source is provided. The feed module comprises a physical interface, a first transformer, a second transformer, a first inductive assembly, a second inductive assembly, a first capacitive assembly, a second capacitive assembly and a connection for a data line which has a first contact point for a first channel with a first pair of wires and has a second contact point for a second channel with a second pair of wires. The physical feed module interface is designed to transmit a first differential data signal to or from the first contact point for the first channel of the data line via the first feed module transformer and the first capacitive feed module assembly, and to transmit a second differential data signal to or from the second contact point for the second channel of the data line via the second feed module transformer and the second capacitive feed module assembly. The first DC voltage source is designed to apply a first DC voltage to the first contact point for the first channel of the data line via the first inductive feed module assembly. The second DC voltage source is designed to apply a second DC voltage to the second contact point for the second channel of the data line via the second inductive feed module assembly.

According to a further embodiment a consumer module for a bus system is provided. The consumer module comprises a first DC voltage consumer, a second DC voltage consumer, a physical interface, a first transformer, a second transformer, a first inductive assembly, a second inductive assembly, a first capacitive assembly and a second capacitive assembly, and a connection for a data line which has a first contact point for a first channel with a first pair of wires and has a second contact point for a second channel with a second pair of wires. The physical consumer module interface is designed to receive a first differential data signal to or from the first contact point for the first channel of the data line via the first consumer module transformer and the first capacitive consumer module assembly, and to receive a second differential data signal to or from the second contact point for the second channel of the data line via the second consumer module transformer and the second capacitive consumer module assembly. The first consumer module DC voltage consumer is designed to transmit a first DC voltage to the first contact point for the first channel of the data line via the first inductive consumer module assembly. The second consumer module DC voltage consumer is designed to receive a second DC voltage at the second contact point for the second channel of the data line via the second inductive consumer module assembly.

The invention is explained in more detail below using figures, in which, in a schematic illustration in each case:

DETAILED DESCRIPTION

Figure 1:
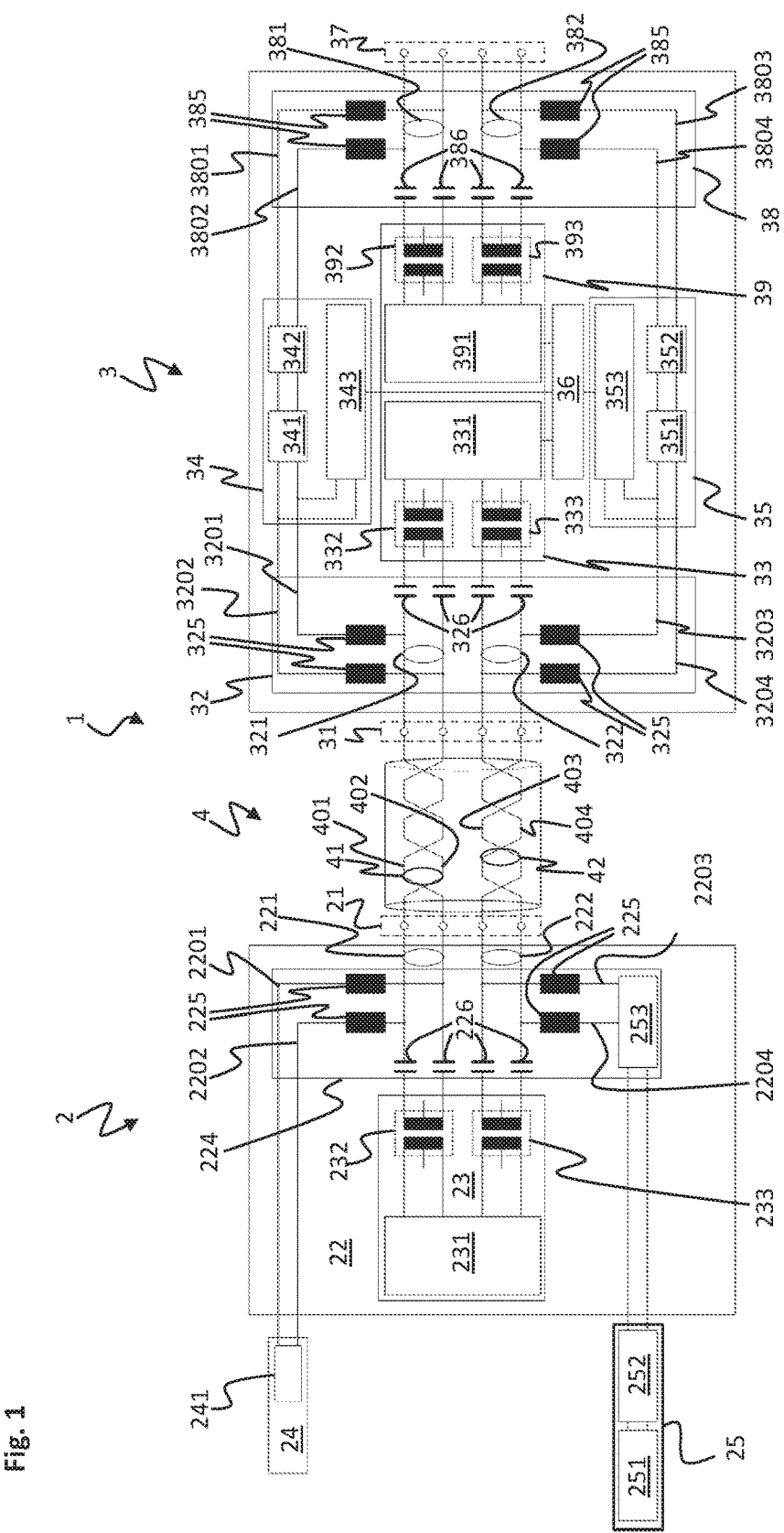
FIG. 1 shows a schematic illustration of a bus system comprising a feed module and a consumer module for combined transmission of two differential data signals and two DC-isolated DC voltages on a four-wire data line.

In bus systems, energy supply and data transmission between the individual assemblies are generally performed via cable connections. The objective in this case is to achieve cost-effective and simple cabling. When bus systems are used in industrial automation, the cabling can be responsible for a significant proportion of the system costs owing to stringent requirements, for example good shielding, a high protection class, a high temperature resistance etc.

When cabling bus systems in industrial automation for supplying energy to the bus system subscribers, care should additionally be taken that the energy supply to the actuators is separate from the energy supply to the sensors or the controller, in order to be able to switch off the actuators independently of the sensors and/or the controller. With this design, the actuators in the automation network can be moved to a safe state at any time by switching off the energy supply, wherein the energy supply for the sensors and the controller in the bus system is maintained at the same time. The automation network can therefore continue to be operated.

A system, in particular for use in industrial automation, is described below, in which system two differential data signals and two DC-isolated voltages can be transmitted using one data line which has to be of at least four-wire design. In this case, the procedure is such that a first differential data signal is transmitted between a physical feed module interface and a physical consumer module interface and a first direct current is transmitted from a first DC voltage source to a first consumer module DC voltage consumer via a first pair of wires of the data line. A second pair of wires of the data line then transmits a second differential data signal between the physical feed module interface and the physical consumer module interface and a second direct current from a second DC voltage source to a second consumer module DC voltage consumer. In this case, the data line is of bidirectional design in respect of data transmission, in order to transmit the first and the second differential data signal from the feed module to the consumer module, and vice versa.

In this case, the first pair of wires of the data line connects the physical feed module interface to the physical consumer module interface via a first feed module transformer, a first capacitive feed module assembly, a first capacitive consumer module assembly and a first consumer module transformer. Furthermore, the first pair of wires connects the first DC voltage source to the first consumer module DC voltage consumer via a first inductive feed module assembly and a first inductive consumer module assembly. The second pair of wires of the data line connects the physical feed module interface to the physical consumer module interface via a second feed module transformer, a second capacitive feed module assembly, a second capacitive consumer module assembly and a second consumer module transformer. The second pair of wires further connects the second DC voltage source to the second consumer module DC voltage consumer via a second inductive feed module assembly and a second inductive consumer module assembly.

Both a differential data signal and also a direct current can be transmitted on each pair of wires with the aid of the two inductive and the two capacitive assemblies which each couple the bus system subscribers to the first and the second pair of wires of the data line. Since the two direct currents are each transmitted on an independent pair of wires, the associated DC voltages are DC-isolated from one another and therefore can also be switched separately. Therefore, the bus system can be used in industrial automation since two separate energy supplies, one energy supply for the actuators and the other energy supply for the sensors and the controller, are provided. No particular requirements which go beyond the requirements of the underlying transmission system are made of the four-wire data power itself. In this case, the bus system can be operated with any desired bus structure, such as with a linear, ring, stone or tree topology. There are no restrictions in respect of the bus protocol used either.

One embodiment of the bus system as a real-time-compatible Ethernet-based field bus for use in industrial automation is explained below.

FIG. 1 shows a schematic illustration of a bus system 1 comprising a feed module 2 and a consumer module 3, which feed module and consumer module are connected to one another via a data line 4. The data line 4 comprises four wires 401, 402, 403, 404, wherein in each case two wires form a twisted pair of wires 41, 42. It is also possible for all four wires to be twisted together, this although leading to disadvantages in respect of electromagnetic compatibility, having the advantage of greater flexibility of the line.

The feed module 2 and the consumer module 3 each have a contact point 21, 31 which connects the data line 4 to the feed module 1 and, respectively, to the consumer module 3. The contact point 21 of the feed module 2 and, respectively, the contact point 31 of the consumer module 3 each comprise four connections, one connection for each wire of the data line 4. In this case, the contact point 21 of the feed module 2 and the contact point 31 of the consumer module can be designed as plug contacts which are connected to the two twisted pairs of wires 41, 42 via corresponding mating pieces on the data line 4. Furthermore, a sensor and controller supply 24 and an actuator supply 25 are provided, said sensor and controller supply and actuator supply being connected to the feed module 2.

The feed module 2 further comprises a coupler unit 22 and a data transmission unit 23. The coupler unit 22 is composed of four line sections 2201, 2202, 2203, 2204 which are each connected to one connection of the contact point 21 and have a first and a second branch. An inductance 225 is arranged in the first branch of each line section 2201, 2202, 2203, 2204, and a capacitance 226 is arranged in the second branch. In each case two line sections 2201, 2202, 2203, 2204 of the coupler unit 22 form a pair of line sections 221, 222, which pair of line sections is associated with a corresponding pair of wires 41, 42 of the data line 4.

The first branches of the two pairs of line sections 221, 222 with the inductances 225 form first clamping points, and the second branches of the two pairs of line sections 221, 222 with the capacitances 226 form second clamping points. The first clamping points of the first branch of the first pair of line sections 221 are connected to the sensor and controller supply 24 which has a power supply unit 241 for impressing a first DC voltage. The first clamping points of the first branch of the second pair of line sections 222 are connected to the actuator supply 25 via a current limiter 253, said actuator supply impressing a second DC voltage, wherein the actuator supply 25 has a power supply unit 251 and a switch 252. The two second clamping points of the two second branches of the two pairs of line sections 221, 222 are connected to the data transmission unit 23 via the capacitances 226 in order to transmit a first and a second differential data signal.

The data transmission unit 23 has a so-called Ethernet physical layer 231 which forms a physical interface between the feed module 2 and a downstream processing unit and codes and decodes data. The Ethernet physical layer 231 provides the first and second differential data signals. The first differential data signal is transmitted from and to the two second clamping points of the second branch of the first pair of line sections 221 via a first transformer 232. The second differential data signal is applied to the two second clamping points of the second branch of the second pair of line sections 22 and is received from there via a second transformer 233.

The feed module 2 therefore makes it possible to transmit both a DC voltage and a differential data signal in an associated pair of wires 41, 42 of the data line 4 via a respective pair of line sections 221, 222 of the coupler unit 22. The first pair of line sections 221 of the coupler unit 22 in the feed module 2 applies the first DC voltage to the first pair of wires 41 of the data line 4 via the contact point 21 and simultaneously transmits the first differential data signal. The second pair of line sections 222 of the coupler unit 22 in the feed module 2 injects the second DC voltage into the second pair of wires 42 of the data line 4 in a parallel manner via the coupling point 21 and simultaneously transmits the second differential data signal.

The two differential data signals and the two DC voltages are isolated from one another by the inductance 225 which is arranged in the first branch of each line section 2201, 2202, 2203, 2204 and the capacitance 226 which is arranged in the second branch of each line section 2201, 2202, 2203, 2204. In this case, the capacitances 226 largely block the DC voltages in the first branches, whereas the inductances 225 substantially suppress the differential data signals in the second branches. In this case, the inductances and the capacitances are designed in such a manner that sufficiently strong attenuation of the differential data signals is carried out in the first branch but low frequencies may also simultaneously occur in the second branch of the pair of line sections, which frequencies result, for example, from use of an auto-negotiation method or the baseline wander effect.

In the consumer module 3, the contact point 31 is followed by an arrangement which is complementary to the feed module and is composed of a coupler unit 32, a data transmission unit 33, a sensor and controller supply 34 and an actuator supply 35. The coupler unit 32 is composed of four line sections 3201, 3202, 3203, 3204 which are each connected to a connection of the contact point 31 and have a first and a second branch. An inductance 325 is again arranged in the first branch of each line section 3201, 3202, 3203, 3204 and a capacitance 326 is arranged in the second branch. In each case two line sections 3201, 3202, 3203, 3204 of the coupler unit 32 form a pair of line sections 321, 322 which is associated with a corresponding pair of wires 41, 42 of the data line 4.

The first branches of the two pairs of line sections 321, 322 with the inductances 325 form first clamping points and the second branches of the two pairs of line sections 321, 322 with the capacitances 326 form second clamping points. The first clamping points of the first branch of the first pair of line sections 321 are connected to the sensor and controller supply 34 in order to be supplied with the first direct current which is transmitted from the feed module 2 onto the first pair of wires 41 of the data line 4. The first clamping points of the first branch of the second pair of line sections 322 are connected to the actuator supply 35 in order to be supplied with the second direct current which is transmitted from the feed module 2 onto the second pair of wires 42 of the data line 4.

Apart from the voltage losses which are caused by the transmission path and the interposed components, the first DC voltage which is impressed into the feed module 2 by the sensor and energy supply 24 is therefore applied to the sensor and controller supply 34 in the consumer module 3. In contrast, the actuator supply 35 in the consumer module 3 is supplied, taking into account the voltage losses during transmission and caused by the interposed components, with the second DC voltage which is applied to the feed module 2 by the actuator supply 25.

As shown in FIG. 1, the sensor and controller supply 34 and the actuator supply 35 in the consumer module 3, each connected upstream of a load 342, 352, can have a blocking unit 341, 351. The blocking unit 341, 351 prevents feedback of the direct current from the load 342 in the sensor and controller supply 34 or the load 352 in the actuator supply 35 in the consumer module 3 to the power supply unit 241 in the sensor and controller supply 24 or to the power supply unit 251 in the actuator supply 25 in the feed module 2.

The two second clamping points of the two second branches of the two pairs of line sections 321, 322 are connected to a data transmission unit 33 in order to receive the first and the second differential data signal which are transmitted by the feed module 2 and to transmit the first and the second differential data signal to the feed module 2. For this purpose, in a similar manner to the data transmission unit 23 in the feed module 2, the data transmission unit 33 has a so-called Ethernet physical layer 331 which forms a physical interface between the feed module 2 and a downstream processing unit 36 and codes and decodes data. The Ethernet physical layer 331 receives and transmits the first differential data signal via a first transformer 332 which is connected to the two second clamping points of the second branch of the first pair of line sections 321. The second differential data signal is transmitted to the Ethernet physical layer 331 via a second transformer 333 which is connected to or from the two second clamping points of the second branch of the second pair of line sections 322.

This structure therefore makes it possible to transmit a DC voltage and a differential data signal in a parallel manner via in each case two preferably twisted wires in the data line 4 between the feed module 2 and the consumer module 3, wherein the two DC voltages are DC-isolated from one another.

In order to use the bus system 1 in industrial automation, it is necessary to configure the energy supply for the actuators in the bus system to be switchable via the second twisted pair of wires 42 in the data line 4. The actuator supply 25 therefore comprises the switch 252 which is arranged downstream of the power supply unit 251 and makes it possible to switch off the actuator supply 25 independently of the sensor and controller supply 24. Switching off the actuator supply 25 makes it possible to move the actuators in the automation network to a safe state without having to interrupt communication. The sensors and the controller are still provided with the first direct current from the sensor and controller supply 24 in the feed module 2 and can be addressed using the first and the second differential data signal.

The switch 252 of the actuator supply 25 is configured as a low-bounce switch in order to prevent the switch from repeatedly closing and opening during operation on account of the mechanical structure. Such repeated closing and opening leads to increased contact erosion and therefore to rapid failure, in particular when high overcurrents occur at the same time. An RS flip-flop, for example, can be used as the low-bounce switch.

In order to prevent switching operations of the actuator supply 25 from disrupting data communication via the second twisted pair of wires 42, the current limiter 253 is integrated into the feed module 2 and is connected to the switch 252 of the actuator supply 25. The current limiter 253 can be used to prevent a high start-up current of the downstream consumer module, which occurs for a short time during the switch-on operation, from exceeding the permissible saturation current of the inductances 225 in the first branches of the second pair of line sections 222 and the inductances 225 virtually completely losing their inductive properties. This would then lead to the differential data signal on the second branches of the second pair of line sections 222 being severely influenced and communication via the second twisted pair of wires 42 in the data line 4 collapsing.

Figure 2:
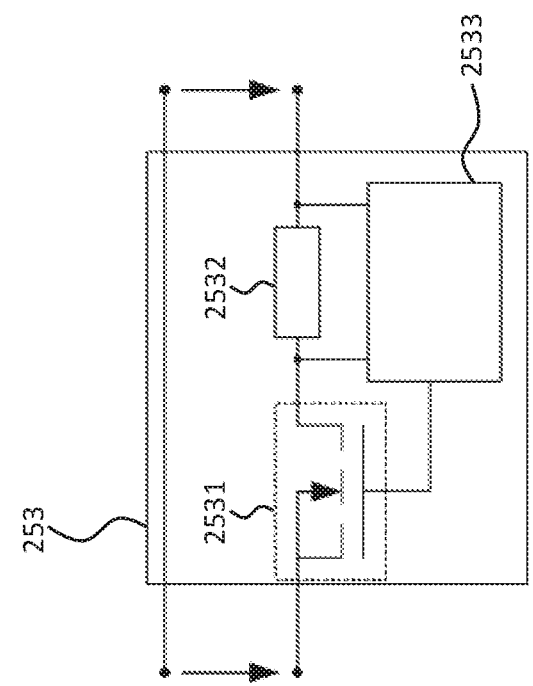
FIG. 2 shows a circuit diagram of a current limiting circuit.

FIG. 2 shows one possible design of the current limiter 253 for use in the feed module 2. The current limiter 253 has in each case two clamping points at the input and at the output, said clamping points being connected to one another via two leadthrough lines. The two input clamping points of the current limiter 253 can be connected to the power supply unit 251 of the actuator supply 25 of the input module 2 by means of the switch 252, wherein the DC voltage which is transmitted by the switch 252 is applied as input voltage. The two output clamping points of the current limiter 253 can be connected to the first branches of the second pair of line sections 224 of the coupler unit 22 in order to supply an output voltage to the inductances 225. The direct current which is drawn by the downstream load, that is to say the direct current which is drawn by the actuator supply 35 in the consumer module 3, flows via the leadthrough lines in the current limiter 253.

A series circuit comprising a transistor 2531, which is a normally-off N-MOSFET in the embodiment shown, and a downstream measurement resistor 2532 is arranged in a leadthrough line path further starting from the input clamping point. In this case, the gate voltage which is applied to the gate of the transistor 2531 determines the voltage which is dropped across the transistor 2531. A controller 2533 which is connected to the gate of the transistor 2531 is further connected in parallel with the measurement resistor 2532. The controller 2533 measures the current flowing across the measurement resistor 2553 and adjusts the gate voltage of the transistor 2531 such that a desired voltage is dropped across the transistor 2531 depending on the measured direct current. The output voltage of the current limiter 253 and therefore the output direct current are then set in accordance with the voltage drop across the transistor 2351, so that overcurrents can be prevented.

In addition to limiting the start-up current, the current limiter 253 also ensures that the maximum continuous current through the inductances 225 in the first branches of the second pair of line sections 222 is limited provided that its thermal loading allows this. The maximum permissible continuous current through the inductances 225 is determined by their non-reactive resistance and the thermal properties. If the maximum permissible continuous current is permanently exceeded, the inductances 225 lose their inductive properties and can be destroyed. The use of a current limiter is generally required only in the feed module.

In the consumer module 3 shown in FIG. 1, both the sensor and controller supply 34 and the actuator supply 35 have a voltage monitoring unit 343, 353, which voltage monitoring units are each clamped to the two leadthrough lines in the sensor and controller supply 34 and, respectively, the actuator supply 35. The two voltage monitoring units 343, 353 can be used to monitor whether both the sensor and controller supply and the actuator supply in the consumer module are each operating in the specified range of the operating voltage.

In the case of the structure shown in FIG. 1, it is possible for the feed module 2 to supply a number of consumer modules which are connected in series and correspond to the consumer module 3 shown in FIG. 1. As illustrated in FIG. 1, the consumer module 3 is constructed in a substantially symmetrical manner in order to transmit the two direct currents which are provided by the feed module 2 on the two twisted pairs of wires 41, 42 of the data line 42 and the two differential data signals onto a further consumer module (not shown). In this case, the further consumer module is in turn connected to a second contact point 37 of the consumer module 3 via a data line having four wires, wherein in each case two wires form a twisted pair of wires.

The consumer module 3 has a second coupler unit 38 which is designed in a complementary manner to the first coupler unit 32. The second coupler unit 38 is composed of four line sections 3801, 3802, 3803, 3804 which are each connected to a connection of the second contact point 37 and have a first and a second branch. An inductance 385 is again arranged in the first branch of each line section 3801, 3802, 3803, 3804 and a capacitance 386 is arranged in the second branch. In each case two line sections 3801, 3802, 3803, 3804 of the coupler unit 38 form a pair of line sections 381, 382 which is associated with a corresponding pair of wires of the data line which can be connected via the second contact point 37.

The first branches of the two pairs of line sections 381, 382 with the inductances 385 form first clamping points and the second branches of the two pairs of line sections 381, 382 with the capacitances 386 form second clamping points. The first clamping points of the first branch of the first pair of line sections 221 are connected to the sensor and controller supply 34 in order to apply the first DC voltage and to therefore transmit the first direct current which is provided by the feed module 2 to a sensor and controller supply of the next consumer module (not shown) via the pair of line sections 381. The first clamping points of the first branch of the second pair of line sections 222 are connected to the actuator supply 35 which impresses the second DC voltage. The second direct current which is provided by the feed module 2 is therefore forwarded to an actuator supply of the next consumer module (not shown) via the pair of line sections 382.

The two second clamping points of the two second branches of the two pairs of line sections 381, 382 are connected to a second data transmission unit 39 which transmits the first and the second differential data signal. For this purpose, in a similar manner to the first data transmission unit 33 in the consumer module 3, the second data transmission unit 39 has a so-called Ethernet physical layer 391 which constitutes a physical interface to the processing unit 36 and codes and decodes data. The Ethernet physical layer 391 transmits and receives the first differential data signal via a first transformer 392 which is connected to the two second clamping points of the second branch of the first pair of line sections 381. The second differential data signal is transmitted from and to the Ethernet physical layer 391 via a second transformer 393 which is connected to the two second clamping points of the second branch of the second pair of line sections 382.

The Ethernet physical layer 331 of the first transmission unit 33 is connected to the Ethernet physical layer 391 of the second transmission unit 39 via the interposed processing device 36 in the consumer module 3. The two differential data signals can therefore be transmitted from the first Ethernet physical layer 331 to the second Ethernet physical layer 391 and back after processing by the interposed processing device 36 and can therefore be looped through the consumer module 3 and can be transmitted to and from a data transmission unit of the next consumer module (not shown).

Coupler units having a combination of inductive and capacitive assemblies are respectively used in the feed module and the consumer modules of the bus system in order to apply two DC-isolated DC voltages to a four-wire data line. Two DC-isolated direct currents can be transmitted in a parallel manner, in addition to two differential data signals, onto the two pairs of wires of the data line using just one single cabling system which consists of the four-wire data line. The functionality of the bus system is not changed.

When using the Ethernet transmission physics, the design of the capacitances in the pair of line sections of the coupler unit is determined by the lower cut-off frequency of the differential data signal which is to be transmitted, which lower cut-off frequency is in turn prespecified by the auto-negotiation process. This cut-off frequency is approximately 2 MHz. The capacitances then have to be designed in such a manner that they do not yet reach saturation at this cut-off frequency, with the result that capacitances of 470 nF are required. In this case, an embodiment having capacitances of 1 µF is preferred in order to compensate for any possible effects of a fluctuating supply voltage.

When designing the inductances of the coupler unit, in particular in the consumer module, it is decisive whether the two DC voltages are conducted, as shown in FIG. 1, with the result that the inductances of the two coupler units in the consumer module are connected to one another. As a result, the two differential data signals are also coupled. The inductances of the coupler units then have to be selected in such a way that crosstalk is prevented. In addition, the properties of the Ethernet physical layer in the data transmission unit are also important for the design of the inductances. In one embodiment, an inductance of greater than 3 µH, preferably 6.8 µH, is used.

A bus system, in particular for use in industrial automation, a feed module and a consumer module for a bus system of this kind are provided, which bus system, feed module and consumer module enable reduced cabling complexity for transmitting two DC-isolated supply voltages, without having an adverse effect on the data communication between the subscribers in the bus system in the process.

A bus system has a feed module which comprises a first DC voltage feed, a second DC voltage feed, a physical interface, a first transformer, a second transformer, a first inductive assembly, a second inductive assembly, a first capacitive assembly and a second capacitive assembly. The bus system further has a consumer module which comprises a first DC voltage consumer, a second DC voltage consumer, a physical interface, a first transformer, a second transformer, a first inductive assembly, a second inductive assembly, a first capacitive assembly and a second capacitive assembly. A data line of the bus system connects the feed module and the consumer module via a first channel, which comprises a first pair of wires, and via a second channel, which comprises a second pair of wires. The first channel of the data line connects the physical feed module interface to the physical consumer module interface via the first feed module transformer, the first capacitive feed module assembly, the first capacitive consumer module assembly and the first consumer module transformer, and connects the first DC voltage source to the first consumer module DC voltage consumer via the first inductive feed module assembly and the first inductive consumer module assembly, in order to transmit a first differential data signal between the physical feed module interface and the physical consumer module interface and to transmit a first direct current from the first DC voltage source to the first consumer module DC voltage consumer. The second channel of the data line connects the physical feed module interface to the physical consumer module interface via the second feed module transformer, the second capacitive feed module assembly, the second capacitive consumer module assembly and the second consumer module transformer, and connects the second DC voltage source to the second consumer module DC voltage consumer via the second inductive feed module assembly and the second inductive consumer module assembly, in order to transmit a second differential data signal between the physical feed module interface and the physical consumer module interface and to transmit a second direct current from the second DC voltage source to the second consumer module DC voltage consumer.

The feed module further has a connection for the data line which comprises a first contact point for the first channel with the first pair of wires and comprises a second contact point for the second channel with the second pair of wires. The physical feed module interface is designed to transmit the first differential data signal to or from the first contact point for the first channel of the data line via the first feed module transformer and the first capacitive feed module assembly, and to transmit the second differential data signal to or from the second contact point for the second channel of the data line via the second feed module transformer and the second capacitive feed module assembly. The first DC voltage source is designed to apply the first DC voltage to the first contact point for the first channel of the data line via the first inductive feed module assembly. The second DC voltage source is designed to apply the second DC voltage to the second contact point for the second channel of the data line via the second inductive feed module assembly.

The consumer module for the bus system further has a connection for the data line which comprises a first contact point for the first channel with the first pair of wires and comprises a second contact point for the second channel with the second pair of wires. The physical consumer module interface is designed to transmit the first differential data signal to or from the first contact point for the first channel of the data line via the first consumer module transformer and the first capacitive consumer module assembly, and to transmit the second differential data signal to or from the second contact point for the second channel of the data line via the second consumer module transformer and the second capacitive consumer module assembly. The first consumer module DC voltage consumer is designed to receive the first DC voltage at the first contact point for the first channel of the data line via the first inductive consumer module assembly. The second consumer module DC voltage consumer is designed to receive the second DC voltage at the second contact point for the second channel of the data line via the second inductive consumer module assembly.

In the feed module and in the consumer module of the bus system, a combination of inductive and capacitive assemblies is used in each case in order to apply two DC-isolated DC voltages to a four-wire data line. In this way, just one single cabling system which is composed of the four-wire data line, can be used to transmit two DC-isolated direct currents in addition to two differential data signals onto the two pairs of wires of the data line in parallel. The functionality of the bus system is not changed, and therefore any desired bus structures, such as star, line or ring, are possible.

The bus system is particularly suitable for use in industrial automation. A separate energy supply for the actuators or for the sensors and the controller can be ensured with the aid of the two direct currents which are carried via the four-wire data line and are DC-isolated from one another. Therefore, it is possible to switch off the actuator supply independently of the sensor or controller supply, so that the compulsory requirement in industrial automation networks of being able to move the outputs of a machine, that is to say the actuators, to a safe state at any time, without interrupting communication with the machine, that is to say it still being possible to address the sensors or the controller, can be complied with.

The first differential data signal and the second differential data signal are each differential Ethernet signals. The bus system and, respectively, the feed module and the consumer module are therefore particularly suitable for use with Ethernet as the communication standard in the automation network.

At least one of the two direct currents which is transmitted from the first or second DC voltage source to the first or second consumer module DC voltage consumer can be switched, wherein the feed module further has a current limiter for the DC voltage source which is associated with the switchable direct current.

The current limiter prevents the start-up current of the downstream consumer module possibly exceeding the saturation current of the inductive assembly, so that the inductance collapses and the decoupling of the applied DC voltage and of the differential data signal can no longer be ensured. The differential data signal is then very severely attenuated, so that fault-free data transmission is no longer possible. A high current of this kind can occur, in particular, when switching on and switching off the energy supply, when, for example, the actuators in an automation network are moved to a safe state or are activated out of said safe state again. Furthermore, the maximum permissible continuous current which flows through the inductance is determined by the non-reactive resistance and the thermal properties of the inductive assembly. However, if this threshold for the maximum permissible continuous current is permanently exceeded, the inductive assembly loses its inductive properties and, in the worst-case scenario, is destroyed.

A low-bounce switch is arranged between the second DC voltage source and the current limiter of the feed module in order to switch the direct current. In the event of bouncing, operation of the switch causes repeated closing and opening of the contact for a short time. However, the repeated closing and opening of the contact leads to increased contact erosion and more rapid failure of the contact, in particular when overcurrents occur at the same time. The use of a low-bounce switch prevents repeated closing and opening of the contact during operation and therefore increases the service life of the contact.

The consumer module has a processing unit, a further physical interface, a third transformer, a fourth transformer, a third inductive assembly and a fourth inductive assembly, a third capacitive assembly and a fourth capacitive assembly. In this case, the processing unit connects the physical consumer module interface to the further physical consumer module interface in order to transmit the first differential data signal and the second differential data signal. Furthermore, the first consumer module DC voltage consumer connects the first inductive consumer module assembly to the third inductive consumer module assembly in order to transmit the first direct current, and the second consumer module DC voltage consumer connects the second inductive consumer module assembly to the fourth inductive consumer module assembly in order to transmit the second direct current. A design of this kind allows the two differential data signals and the two DC-isolated DC voltages to be forwarded by the consumer module, as a result of which a bus system design which is simpler, particularly in respect of cabling, can be implemented, for example a linear series of a plurality of consumer modules.

The consumer module has a voltage monitoring assembly which is connected to the first consumer module and to the second consumer module in order to monitor whether the first consumer module and the second consumer module are each operating in a specified range of the operating voltage. Improved diagnoses in the bus system as possible owing to the integration of the voltage monitoring assembly, as a result of which any fault search can be simplified.

The invention claimed is:

1. A bus system comprising
a feed module which is connected to a first DC voltage source and to a second DC voltage source and has a physical interface, a first transformer, a second transformer, a first inductive assembly, a second inductive assembly, a first capacitive assembly and a second capacitive assembly, a consumer module which has a first DC voltage consumer, a second DC voltage consumer, a physical interface, a first transformer, a second transformer, a first inductive assembly, a second inductive assembly, a first capacitive assembly and a second capacitive assembly,
a data line which has a first channel with a first pair of wires and a second channel with a second pair of wires,
wherein the first channel of the data line connects the physical feed module interface to the physical consumer module interface via the first feed module transformer, the first capacitive feed module assembly, the first capacitive consumer module assembly and the first consumer module transformer, and connects the first DC voltage source to the first consumer module DC voltage consumer via the first inductive feed module assembly and the first inductive consumer module assembly, in order to transmit a first differential data signal between the physical feed module interface and the physical consumer module interface and to transmit a first direct current from the first DC voltage source to the first consumer module DC voltage consumer, and
wherein the second channel of the data line connects the physical feed module interface to the physical consumer module interface via the second feed module transformer, the second capacitive feed module assembly, the second capacitive consumer module assembly and the second consumer module transformer, and connects the second DC voltage source to the second consumer module DC voltage consumer via the second inductive feed module assembly and the second inductive consumer module assembly, in order to transmit a second differential data signal between the physical feed module interface and the physical consumer module interface and to transmit a second direct current from the second DC voltage source to the second consumer module DC voltage consumer.

2. The bus system according to claim 1, wherein the first direct current and the second direct current are carried DC-isolated from one another via the four-wire data line to provide a separate energy supply to first consumer module DC voltage consumer by the first DC current source and the second consumer module DC voltage consumer by the second DC voltage source.

3. The bus system according to claim 1, wherein at least one of the two direct currents which is transmitted from the first DC voltage source or from the second DC voltage source to the first consumer module DC voltage consumer or to the second consumer module DC voltage consumer can be switched, wherein the feed module further has a current limiter for the DC voltage source which is associated with the switchable direct current.

4. The bus system according to claim 3, wherein the current limiter has a series circuit comprising a transistor and a measurement resistor, through which the second direct current flows, and has a controller, wherein the controller is designed to detect the direct current flowing through the measurement resistor and to drive the transistor such that the direct current flowing across the transistor does not exceed a prespecified limit value.

5. The bus system according to claim 3, wherein a low-bounce switch is arranged between the second DC voltage source and the current limiter of the feed module.

6. The bus system according to claim 1, wherein the consumer module has a processing unit, a further physical interface, a third transformer, a fourth transformer, a third inductive assembly and a fourth inductive assembly, a third capacitive assembly and a fourth capacitive assembly,
wherein the processing unit connects the physical consumer module interface to the further physical consumer module interface in order to transmit the first differential data signal and the second differential data signal,
wherein the first consumer module DC voltage consumer connects the first inductive consumer module assembly to the third inductive consumer module assembly in order to transmit the first direct current, and
wherein the second consumer module DC voltage consumer connects the second inductive consumer module assembly to the fourth inductive consumer module assembly in order to transmit the second direct current.

7. The bus system according to claim 1, wherein the consumer module has a voltage monitoring assembly which is connected to the first consumer module DC voltage consumer and to the second consumer module DC voltage consumer in order to monitor whether the first consumer module DC voltage consumer and the second consumer module DC voltage consumer are each operating in a specified range of the operating voltage.

8. The bus system according to claim 1, wherein the first differential data signal and the second differential data signal are each differential Ethernet signals.

9. The bus system according to claim 1 for use in industrial automation, wherein the first consumer module DC voltage consumer is any of a sensor or a controller, and the second consumer module DC voltage consumer is an actuator.

10. A feed module for a bus system which has a first DC voltage source and a second DC voltage source, comprising
a physical interface, a first transformer, a second transformer, a first inductive assembly, a second inductive assembly, a first capacitive assembly, a second capacitive assembly and a connection for a data line which has a first contact point for a first channel with a first pair of wires and has a second contact point for a second channel with a second pair of wires,
wherein the physical feed module interface is designed to transmit a first differential data signal to or from the first contact point for the first channel of the data line via the first feed module transformer and the first capacitive feed module assembly, and to transmit a second differential data signal to or from the second contact point for the second channel of the data line via the second feed module transformer and the second capacitive feed module assembly, wherein the first DC voltage source is designed to apply a first DC voltage to the first contact point for the first channel of the data line via the first inductive feed module assembly, and wherein the second DC voltage source is designed to apply a second DC voltage to the second contact point for the second channel of the data line via the second inductive feed module assembly.

11. The feed module according to claim 10, wherein the first DC voltage and the second DC voltage are DC-isolated from one another.

12. The feed module according to claim 10,
wherein at least one of the two direct currents which is transmitted from the first or from the second DC voltage source can be switched, and
wherein a current limiter is provided for the DC voltage source which is associated with the switchable direct current.

13. The feed module according to claim 12,
wherein the current limiter has a series circuit comprising a transistor and has a measurement resistor, through which the second direct current flows, and has a controller,
wherein the controller is designed to detect the direct current flowing through the measurement resistor and to drive the transistor such that the direct current flowing across the transistor does not exceed a pre-specified limit value.

14. The feed module according to claim 12, wherein a low-bounce switch is arranged between the second DC voltage source and the current limiter of the feed module.

15. A consumer module for a bus system, comprising a first DC voltage consumer, a second DC voltage consumer, a physical interface, a first transformer, a second transformer, a first inductive assembly, a second inductive assembly, a first capacitive assembly and a second capacitive assembly, and a connection for a data line which has a first contact point for a first channel with a first pair of wires and has a second contact point for a second channel with a second pair of wires,
wherein the physical consumer module interface is designed to receive a first differential data signal to or from the first contact point for the first channel of the data line via the first consumer module transformer and the first capacitive consumer module assembly, and to receive a second differential data signal to or from the second contact point for the second channel of the data line via the second consumer module transformer and the second capacitive consumer module assembly,
wherein the first consumer module DC voltage consumer is designed to transmit a first DC voltage to the first contact point for the first channel of the data line via the first inductive consumer module assembly, and
wherein the second consumer module DC voltage consumer is designed to receive a second DC voltage at the second contact point for the second channel of the data line via the second inductive consumer module assembly.

16. The consumer module according to claim 15, wherein the first DC voltage and the second DC voltage are DC-isolated from one another.

17. The consumer module according to claim 15, which further has a processing unit, a further physical interface, a third transformer, a fourth transformer, a third inductive assembly and a fourth inductive assembly, a third capacitive assembly and a fourth capacitive assembly,
wherein the physical consumer module interface is connected to the further physical consumer module interface in order to transmit the first differential data signal and the second differential data signal,
wherein the first consumer module DC voltage consumer connects the first inductive consumer module assembly to the third inductive consumer module assembly in order to transmit the first direct current, and
wherein the second consumer module DC voltage consumer connects the second inductive consumer module assembly to the fourth inductive consumer module assembly in order to transmit the second direct current.

18. The consumer module according to claim 15, wherein a voltage monitoring assembly is provided, which voltage monitoring assembly is connected to the first consumer module DC voltage consumer and to the second consumer module DC voltage consumer in order to monitor whether the first consumer module DC voltage consumer and the second consumer module DC voltage consumer are each operating in a specified range of the operating voltage.

* * * * *